US007315827B2

(12) United States Patent
Hshieh et al.

(10) Patent No.: US 7,315,827 B2
(45) Date of Patent: Jan. 1, 2008

(54) METHOD AND SYSTEM FOR COMMUNICATING SEMICONDUCTOR MANUFACTURING INFORMATION TO CUSTOMERS

(75) Inventors: Hui-Jye Hshieh, Hsin-Chu (TW); Tu Shao Chi, Hsin-Chu (TW); Jung-Yi Tsai, Hsin-Chu (TW); Chui-Chung Chiu, Hsin-Chu (TW); Wendy Chang, Taipei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 398 days.

(21) Appl. No.: 10/822,522

(22) Filed: Apr. 12, 2004

(65) Prior Publication Data

US 2005/0240454 A1    Oct. 27, 2005

(51) Int. Cl.
*G06F 17/50* (2006.01)
(52) U.S. Cl. .............................. 705/7; 705/28; 700/121
(58) Field of Classification Search .................. 700/90, 700/95, 96, 99, 108, 109, 110, 121; 705/7, 705/8, 26, 27, 28, 29; 340/540
See application file for complete search history.

(56) References Cited

U.S. PATENT DOCUMENTS 5,943,484 A * 8/1999 Milne et al. .................. 700/99
6,839,601 B1 * 1/2005 Yazback et al. ............. 700/121
6,928,334 B2 * 8/2005 Kuo ........................... 700/121
2002/0143650 A1 * 10/2002 Matsuda ....................... 705/26
2003/0125972 A1 * 7/2003 Luce et al. ..................... 705/1
2005/0060212 A1 * 3/2005 Annamaneni et al. ......... 705/7
2005/0086120 A1 * 4/2005 Shao-Chi et al. ............. 705/26
2005/0108101 A1 * 5/2005 Hsu et al. ..................... 705/26

OTHER PUBLICATIONS

Hsieh, Dennys Sung-Ting, et al., "TSMC Turnkey Data Mart", SMTW 2002 Symposium, http://dennys.tiger2.net/me/publication/2002.12.10_smtw/index.html, printed on Jan. 9, 2004, 5 pages.
Hseih, Dennys Sung-Ting, et al., "B2B in TSMC Turnkey Service", ISSM 2001 Symposium, http://dennys.tiger2.net/me/publication/2001.10.08_issm/index.html, printed on Jan. 9, 2004, 5 pages.
Hsieh, Dennys Sung-Ting, et al., "B2B in TSMC Turnkey Services", ISSM 2001, San Jose, California, Oct. 10-12, 2001, 4 pages.
Hsieh, Dennys Sung-Ting, et al., "TSMC Turnkey Data Mart", SMTW 2002, Hsin-Chu, Taiwan, Dec. 10-11, 2002, 4 pages.
Dennys Sung-Ting Hsieh et al., "B2B in TSMC Turnkey Services", 4 pgs.

* cited by examiner

*Primary Examiner*—Leo Picard
*Assistant Examiner*—Charles Kasenge
(74) *Attorney, Agent, or Firm*—Haynes Boone, LLP

(57) ABSTRACT

A method of communicating semiconductor manufacturing information. The method includes providing, by a first service provider, a lot of semiconductor components to a second service provider for processing. The method also includes receiving from the second service provider, by the first service provider, first information associated with the processing. The method further includes outputting to a customer, by the first service provider, second information determined in response to the first information.

4 Claims, 4 Drawing Sheets

US 7,315,827 B2

METHOD AND SYSTEM FOR COMMUNICATING SEMICONDUCTOR MANUFACTURING INFORMATION TO CUSTOMERS

FIELD OF DISCLOSURE

The present disclosure relates generally to the field of semiconductor manufacturing and, more particularly, to a method and system for more efficiently communicating semiconductor manufacturing information to customers.

BACKGROUND

The semiconductor integrated circuit ("IC") industry has experienced rapid growth. Technological advances in IC materials and design have produced generations of ICs where each generation has smaller and more complex circuits than the previous generation. However, these advances have increased the complexity of processing and manufacturing ICs and, for these advances to be realized, similar developments in IC processing and manufacturing have been needed. For example, an IC is formed by creating one or more devices (e.g., circuit components) on a substrate using a fabrication process. As the geometry of such devices is reduced to the submicron or deep submicron level the IC's active device density (i.e., the number of devices per IC area) and functional density (i.e., the number of interconnected devices per IC area) has become limited by the fabrication process.

Furthermore, as the IC industry has matured, the various operations needed to manufacture an IC may be performed at different locations by a single company or by different companies that specialize in a particular area. This further increases the complexity of producing ICs, as companies and their customers may be separated not only geographically, but also by time zones, making effective communication more difficult. For example, a first company (e.g., an IC design house) may design a new IC, a second company (e.g., an IC foundry) may provide the processing facilities used to fabricate the design, and a third company may assemble and test the fabricated IC. A fourth company may handle the overall manufacturing of the IC, including coordination of the design, processing, assembly, and testing operations.

For manufacturer's of IC's, efficiently providing information (e.g., ship date) associated with the IC manufacturing process to customers is important. In a complex IC manufacturing environment, such as described above, collecting and transmitting of production information involves collecting information from various entities performing the various operations needed to produce an IC.

With previous techniques, IC manufacturers rely more on humans for manual collection and distribution of IC manufacturing information. However, such techniques are less efficient and more likely to be erroneous. Accordingly, what is needed is a method and system without the disadvantages described above.

DETAILED DESCRIPTION

Figure 1:
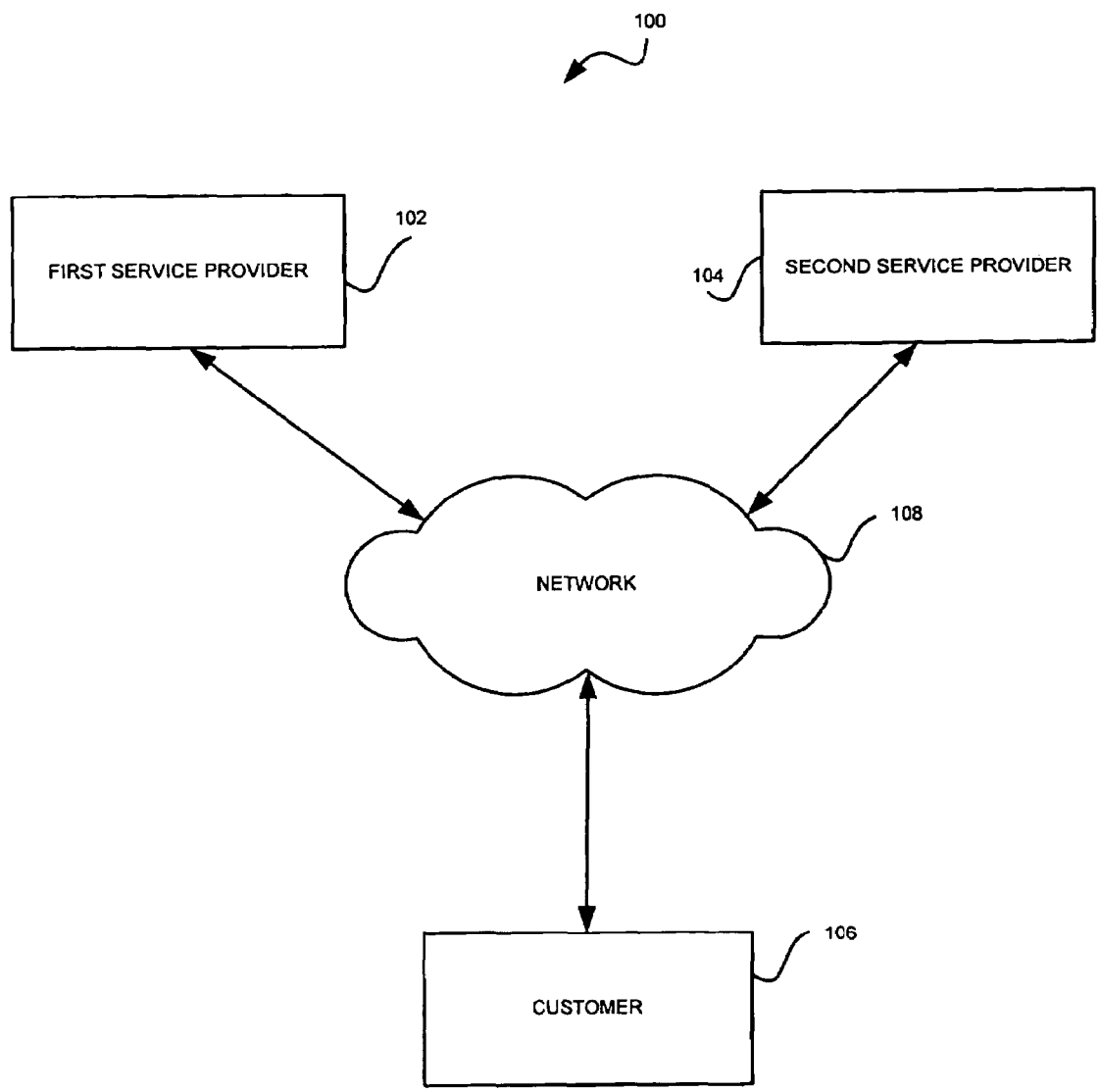
FIG. 1 is a block diagram of a system according to the illustrative embodiment.

FIG. 1 is a block diagram of a system, indicated generally at 100 according to the illustrative embodiment. System 100 includes: (a) a first service provider 102, (b) a second service provider 104, and (c) a customer 106. The first service provider 102 is a semiconductor component (e.g., IC or wafer) fabrication service provider (or a foundry). The second service provider 104 is a circuit probe (e.g., circuit test) service provider. Moreover, the customer 106 is a customer which purchases IC's that are fabricated by the first service provider 102 and tested by the second service provider 104.

In response to its completing the fabrication of a lot of IC's, the first service provider 102 sends (e.g., ships) the lot of IC's to the second service provider 104 for further processing (e.g., circuit probing). In response to receiving the lot of IC's, the second service provider 104 performs circuit probing of the lot of IC's, and sends the approved IC's to the customer 106.

In the illustrative embodiment, the first service provider 102 and the second service provider 104 are independent business organizations. Furthermore, in at least one version of the illustrative embodiment, the second service provider 104 is a business organization that is affiliated with the customer 106 (e.g., the second service provider 104 is a wholly owned subsidiary of the customer 106).

Each of the first service provider 102, the second service provider 104, and the customer 106 includes one or more respective computing systems. Also, each of the computing systems of the first service provider 102, the second service provider 104, and the customer 106 includes a respective information handling system ("IHS"), such as a personal computer, a personal digital assistant, a pager, or a cellular phone.

Referring again to FIG. 1, the system 100 includes a network 108 (e.g., a Transport Control Protocol/Internet Protocol ("TCP/IP"), such as the Internet or an intranet). Accordingly, each of computing systems of the first service provider 102, the second service provider 104, and the customer 106 includes a respective network interface for communicating with the network 108.

Figure 2:
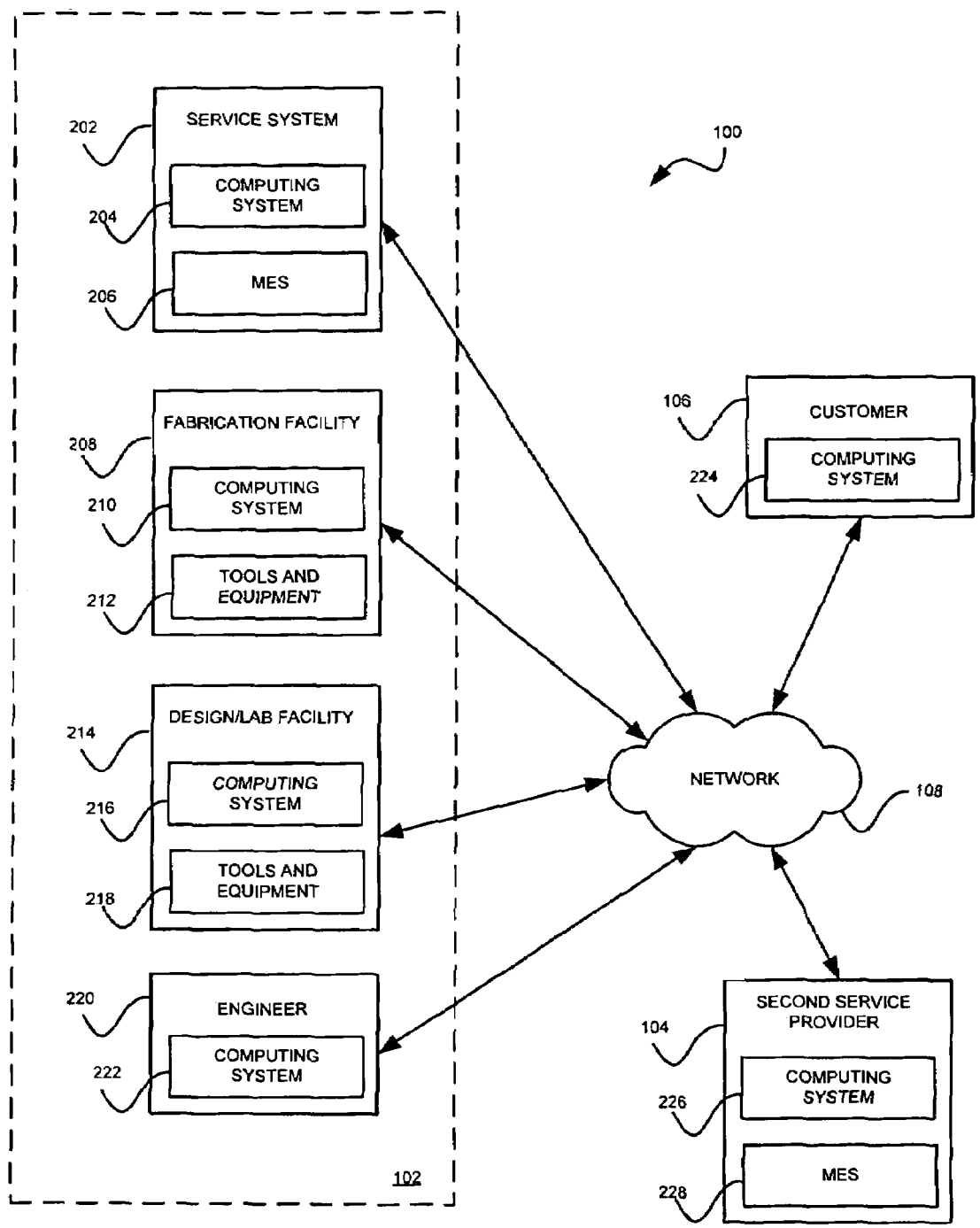
FIG. 2 is a more detailed block diagram of the system of FIG. 1.

FIG. 2 is a more detailed block diagram of the system 100 of FIG. 1. As shown, the first service provider 102 includes the following entities: a service system 202, a fabrication facility 208, a design/lab facility 214, and an engineering system 220. Each of the entities 202, 208, 214, and 220 includes a respective computing system, and is coupled to one another, to the customer 106, and the second service provider 104 via the network 108. For communicating with the network 108, and with other entities, each of the entities includes a respective network interface (e.g., in association with the respective computing systems). Each of the entities performs the operations discussed below.

The service system 202 is an interface between a customer (e.g., the customer 106) and the first service provider 102, for communicating information about manufacturing operations between the customer and the first service provider 102. For facilitating such communication, the service system 202 includes a computing system 204. The service system 202 also includes a manufacturing execution system ("MES") 206.

The MES 206 is an integrated computing system including one or more IHS's and one or more software applications. The MES 206 performs various operations to facilitate manufacturing of IC's. For example, the MES 206 collects various information in real time, organizes and stores the information in a centralized database, manages work orders, manages workstations, manages manufacturing processes, tracks inventory, and manages relevant documents. For performing the operations discussed above, the MES 206 is coupled to other systems and entities of the system 100.

The MES 206 is implemented by utilizing one or more of several commercially available products. Such commercially available products include Promis (Books Automations Inc. of Massachusetts), Workstream (Applied Materials, Inc. of California), Poseidon (IBM Corporation of New York), and Mirl-MES (Mechanical Industry Research Laboratories of Taiwan). Each of these products includes a different application within the semiconductor manufacturing industry. For example, Mirl-MES is often used in applications involving packaging, liquid crystal displays ("LCD's"), and printed circuit boards ("PCB's"). Promis, Workstream, and Poseidon are often used in IC fabrication and thin film transistor ("TFT") LCD applications.

The fabrication facility 208 is for fabrication of IC's. Accordingly, the fabrication facility 208 includes fabrication tools and equipment 212. For example, the tools and equipment 212 include an ion implantation tool, a chemical vapor deposition tool, a thermal oxidation tool, a sputtering tool, various optical imaging system, and software for controlling the various tools and equipment. The fabrication facility 208 also includes a computing system 210.

The design/lab facility 214 is for designing and testing of IC's. The design/lab facility 214 includes design/test tools and equipment 218. The tools and equipment 218 include one or more software applications and hardware systems. The design/lab facility 214 also includes a computing system 216.

The engineer 220 collaborates in the IC manufacturing process with other entities (e.g., the service system 202, or other engineers). For example, the engineer 220 collaborates with other engineers and the design/lab facility 214 for designing and testing IC's, monitors fabrication processes at the fabrication facility 208, and receives information regarding runs and yields. In at least one embodiment, the engineer 220 also communicates directly with the customer 106. In performing its various operations, the engineer 220 utilizes a computing system 222.

Similar to each of the entities of the first service provider 102, the customer 106 includes a computing system 224. Likewise, the second service provider 104 also includes a computing system 228. The second service provider 104 further includes a MES 228, which performs operations that are substantially similar to those performed by the MES 206 of the first service provider 102. However, such functions are performed in the context of the processes (i.e., processes associated with circuit probing) performed by the second service provider 104. Although the functions performed by the MES 206 and the MES 228 are substantially similar, each of the MES's 206 and 228 includes an interface that is dissimilar to (or incompletely compatible with) one another.

Figure 3:
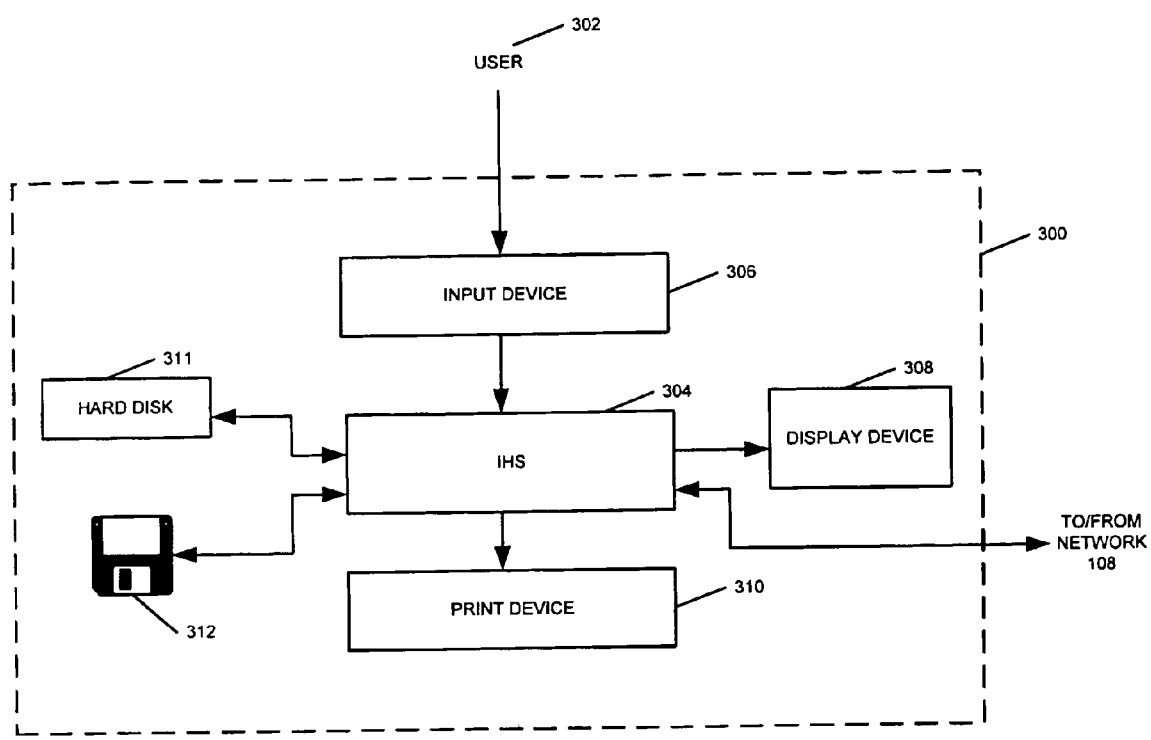
FIG. 3 is a block diagram of a representative computing system employed in the system of FIG. 2.

FIG. 3 is a block diagram of a representative one of the computing systems of FIG. 2. Such representative computing system is indicated by dashed enclosure 300. Each of the computing systems of FIG. 2 operates in association with a respective human user. Accordingly, in the example of FIG. 3, the computing system 300 operates in association with a human user 303, as discussed further below.

As shown in FIG. 3, the computing system 300 includes (a) input devices 306 for receiving information from human user 302, (b) a display device 308 (e.g., a conventional electronic cathode ray tube ("CRT") device) for displaying information to user 302, (c) an IHS 304 for executing and otherwise processing instructions, (d) a print device 310 (e.g., a conventional electronic printer or plotter), (e) a nonvolatile storage device 311 (e.g., a hard disk drive or other computer-readable medium (or apparatus), as discussed further below) for storing information, (f) a computer-readable medium (or apparatus) 312 (e.g., a portable floppy diskette) for storing information, and (g) various other electronic circuitry for performing other operations of the computing system 300.

For example, the IHS 304 includes (a) a network interface (e.g., circuitry) for communicating between the IHS 304 and the network 108 and (b) a memory device (e.g., random access memory ("RAM") device and read only memory ("ROM") device) for storing information (e.g., instructions executed by the IHS 304 and data operated upon by the IHS 304 in response to such instructions). Accordingly, the IHS 304 is connected to the network 108, the input devices 306, the display device 308, the print device 310, the storage device 311, and the computer-readable medium 312, as shown in FIG. 3.

Also for example, in response to signals from the IHS 304, the display device 308 displays visual images, and the user 302 views such visual images. Moreover, the user 302 operates the input devices 306 to provide information to the IHS 304, and the IHS 304 receives such information from the input devices 306. Also, in response to signals from the IHS 304, the print device 310 prints visual images on paper, and the user 302 views such visual images.

The input devices 306 include, for example, a conventional electronic keyboard and a pointing device such as a conventional electronic "mouse", rollerball or light pen. The user 302 operates the keyboard to provide alphanumeric text information to the IHS 304, and the IHS 304 receives such alphanumeric text information from the keyboard. The user 302 operates the pointing device to provide cursor-control information to the IHS 304, and the IHS 304 receives such cursor-control information from the pointing device.

Figure 4:
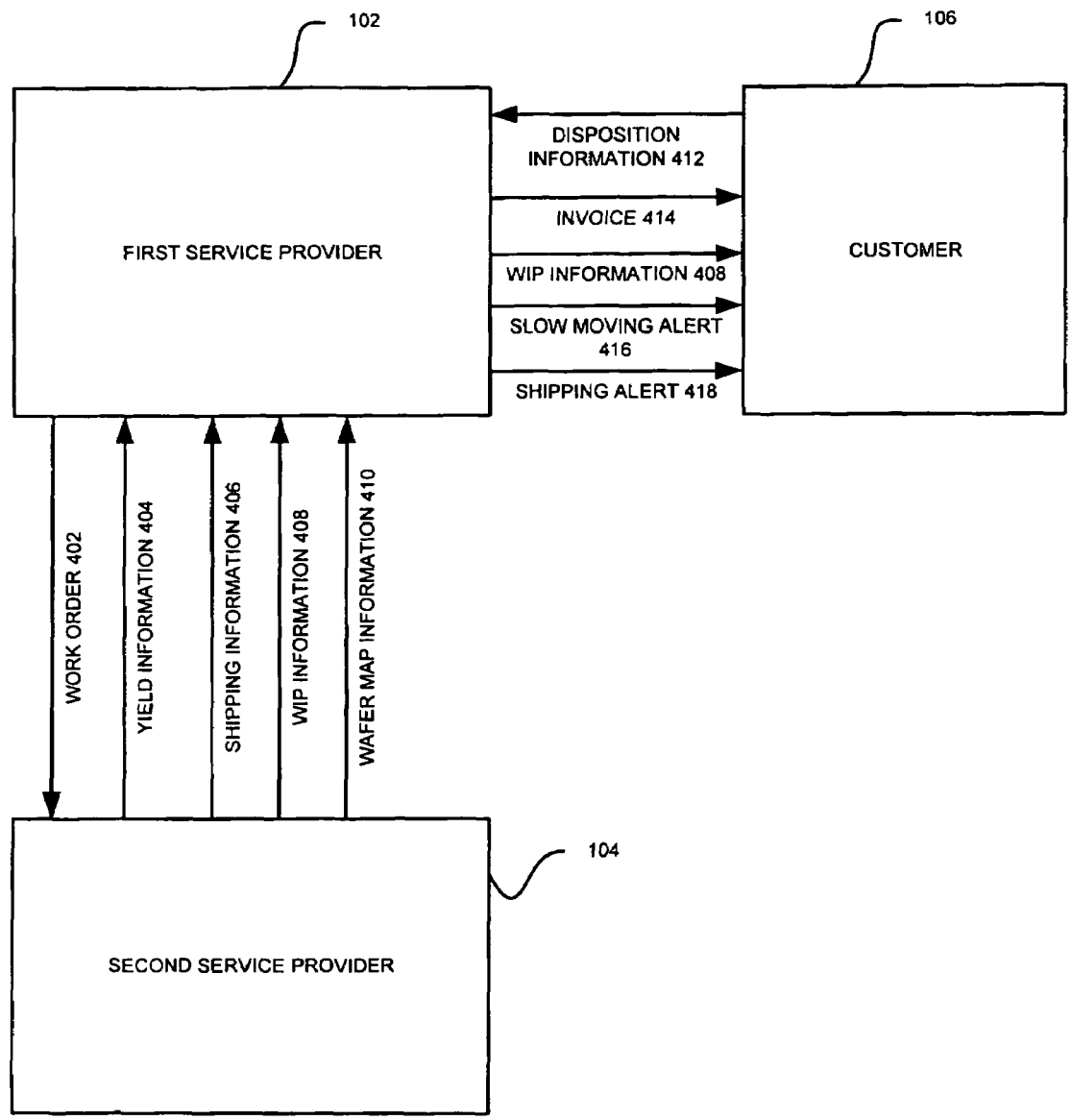
FIG. 4 is a data flow diagram illustrating the flow of information in the system of FIG. 1.

As discussed above in connection with FIG. 2, each of the MES 206 and the MES 228 includes an interface that is dissimilar to (or incompletely compatible with) one another. The dissimilarity (or incomplete compatibility) causes difficulties in transmission of information about orders and processing of IC's between the first service provider 102 and the second service provider 104 via the MES 206 and the MES 228. Accordingly, in the illustrative embodiment, the first service provider 102 and the second service provider 104 transmit such information using one or more standard communication protocols. For example, via the network 108, the first service provider 102's one or more computing systems (e.g., the computing system 204) output information about an order (e.g., purchase order) to the second service provider 104, and receive information (e.g., work in process ("WIP"), yield, or shipping date) about processing IC's from the second service provider 104. Similarly, through the network 108, the second service provider 104's one or more computing systems (e.g., the computing system 226) output such information about the processing of IC's to the first service provider 102, and receive such information about the order from the first service provider. FIG. 4 illustrates such transmission of information in more detail.

Accordingly, FIG. 4 is a data flow diagram illustrating the flow of information in the system 100 of FIG. 1. As shown in FIG. 4, the first service provider 102, the second service provider 104, and the customer 106 receive and output various information. More particularly, the first service provider 102, the second service provider 104, and the customer 106's respective computing systems perform such receiving and outputting. For clarity, the following discussion references the computing system 204 as performing the first service provider 102's operations to output and receive information. Similarly for clarity, the following discussion references the computing system 226 as performing the second service provider 104's operations to output and receive information, and the computing system 224 as performing the customer 106's operations to output and receive information. However, such references do not limit the scope of this disclosure.

Referring again to FIG. 4, the computing system 204 outputs a work order 402 to the computing system 226. The computing system 204 outputting the work order 402 is associated with the first service provider 102 providing a lot of IC's to the second service provider 104 for circuit probing. Accordingly, the computing system 204 outputs an instance of the work order 402 for one or more lots of IC's that the first service provider 102 provides to the second service provider 104 for circuit probing.

Also, in the version of the illustrative embodiment in which the second service provider 104 is affiliated with the customer 106, the work order 402 is a "virtual" work order. In such an embodiment, the work order 402 does not include conventional billing information. For example, the work order 402 includes $0 as the billing amount.

In association with a lot of IC's received by the second service provider 104 from the first service provider 102, the computing system 226 outputs (to the computing system 204) various information including: (a) yield information 404, (b) shipping information 406, (c) WIP information 408, and (d) wafer map information 410. In response to the above received information, the computing system 204 outputs to the computing system 224, various information including: (a) an invoice 414, (b) the WIP information 408, (c) a "slow moving" alert 416, and (d) a shipping alert 418.

As can be seen, information output by the computing system 204 (and received by the computing system 224) include information that is identical or substantially similar to the information output by the computing system 226 (e.g., the WIP information 408). Conversely, the computing system 204 also outputs information which is determined in response the information output by the computing system 226 or the computing system 224. For example, the computing system 204 determines the information included in the "slow moving" alert 416 in response to the WIP information 408. The "slow moving" alert 416, when received by the computing system 226, indicates to the customer 106 that the second service provider 104 is processing a lot of IC's at a rate slower than a previously determined rate. Likewise, the computing system 204 determines the information included in shipping alert 418 in response to the shipping information 406. The shipping alert 418 includes a date on which the customer 106 can expect to receive a lot of finished IC's. Furthermore, the computing system 204 determines the information (e.g., quantity to bill for) included in the invoice 414 in response to disposition information 412. The disposition information 412 includes indication of whether a cost of an IC will be included in the invoice 414. For example, in the illustrative embodiment, the disposition information 414 indicates that the cost of an IC damaged in shipment or failing a screening quality check performed by the second service provider 104, is specified to not be included in the invoice 414.

As discussed above, the outputting and receiving performed by each of the computing systems 204, 224 and 226 utilize one or more standard communication protocols. For example, in the illustrative embodiment, the one or more communication protocols include file transfer protocol ("FTP"). In at least one other embodiment, such protocols include the hyper text transfer protocol ("HTTP").

Although illustrative embodiments have been shown and described, a wide range of modification, change and substitution is contemplated in the foregoing disclosure and, in some instances, some features of the embodiments may be employed without a corresponding use of other features. Accordingly, broad constructions of the appended claims in manner consistent with the scope of the embodiments disclosed, are appropriate.

What is claimed is:

1. A method of communicating semiconductor manufacturing information, the method comprising:
   providing, by a first service provider, a lot of semiconductor components to a second service provider for processing;
   receiving, by the first service provider, first information associated with the processing, from the second service provider;
   generating, by the first service provider, second information responsive to the first information; and
   outputting, by the first service provider, the second information to a customer affiliated with the second service provider;
   wherein the first service provider includes a first manufacturing execution system ("MES"), the second provider includes a second MES, the first MES and the second MES are dissimilar.

2. A method of communicating semiconductor manufacturing information, the method comprising:
   providing, by a first service provider, a lot of semiconductor components to a second service provider for processing;
   receiving, by the first service provider, first information associated with the processing, from the second service provider
   generating, by the first service provider, second information responsive to the first information; and
   outputting, by the first service provider, the second information to a customer affiliated with the second service provider;
   wherein the first information includes work-in-process ("WIP") information, wherein the second information includes a determination of whether a time duration associated with the processing of a component of the lot exceeds a predetermined duration of time.

3. A system for communicating semiconductor manufacturing information, comprising:
   an information handling system ("IHS") associated with a first service provider for:
      from a second service provider, receiving first information associated with processing of a lot of semiconductor components, the lot having been provided by the first service provider to the second service provider for the processing;
      generating second information responsive to the first information; and
   to a customer affiliated with the second service provider, outputting the second information;
   wherein the first service provider includes a first manufacturing execution system ("MES"), the second service provider includes a second MES, and the first MES and the second MES are dissimilar.

4. A system for communicating semiconductor manufacturing information, comprising:

an information handling system ("IHS") associated with a first service provider for:

from a second service provider, receiving first information associated with processing of a lot of semiconductor components, the lot having been provided by the first service provider to the second service provider for the processing;

generating second information responsive to the first information; and to a customer affiliated with the second service provider, outputting the second information;

wherein the first information includes work-in-process ("WIP") information, wherein the second information includes a determination of whether a time duration associated with the processing of a component of the lot exceeds a predetermined period of time.

* * * * *